Oct. 26, 1948.    C. J. HAHN    2,452,458
HUB STRUCTURE
Filed May 23, 1945

Clarence J. Hahn
INVENTOR

BY
ATTORNEY

Patented Oct. 26, 1948

2,452,458

UNITED STATES PATENT OFFICE 2,452,458

HUB STRUCTURE

Clarence J. Hahn, Buffalo, N. Y., assignor to Worthington Pump and Machinery Corporation, Harrison, N. J., a corporation of Delaware Application May 23, 1945, Serial No. 595,462

1 Claim. (Cl. 287—53)

This invention relates to rotative power transmitting devices, and more particularly to a hub structure for adapting such rotative devices to shafts of different diameters. Stock sheaves are manufactured in certain standard sizes, both with respect to different sheave diameters for a given shaft diameter, and different shaft diameters for a sheave of given diameter. For that reason dealers in stock sheaves are required to carry an enormous supply on hand in order to meet the needs of the trade, particularly in connection with fractional horsepower stock. Simplification in matters of production and reduction in the number of sheave units which are required to make up the essential supply on hand reside in the adaptation of stock sheaves of a given diameter or of different diameters to a large range of shaft diameters.

Accordingly, an object of the present invention is to provide a hub structure embodying an adapter hub and a hub part, the latter comprising a part of the sheave or other rotative device, in which the adapter hub is provided with an axial bore for the reception of the usual work shaft and is slit longitudinally to be flexed upon the shaft, wherein the adapter hub and the hub part are provided with co-active tapers to wedge the adapter hub between the hub part and the shaft through relative longitudinal shifting of the parts, and in which means are provided for shifting the hub part relatively to the adapter hub, with the means so arranged as to embody a key function.

With these and other objects in view, as may appear from the accompanying specification, the invention consists of various features of construction and combination of parts, which will be first described in connection with the accompanying drawings, showing a hub structure of a preferred form embodying the invention, and the features forming the invention will be specifically pointed out in the claim.

Figure 1:
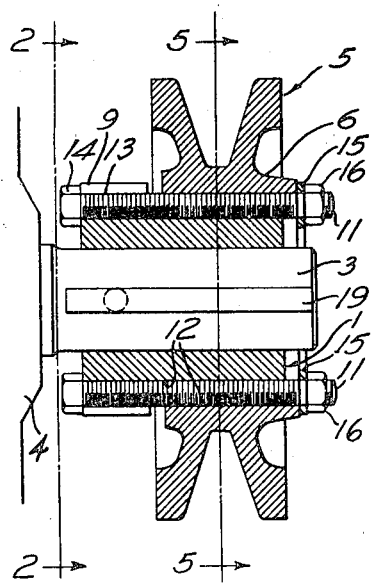
Figure 1 is a sectional view of a hub structure in accordance with the present invention.
Figure 5:
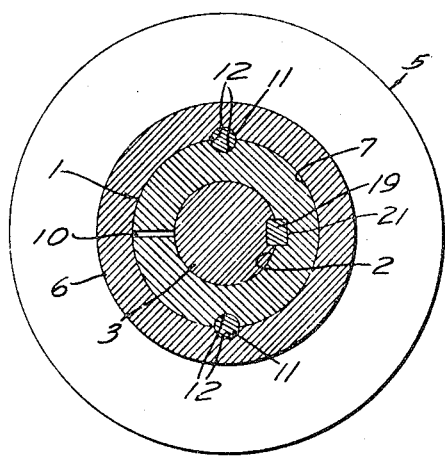
Figure 5 is a sectional view taken along the line 5—5 of Figure 1.

Figures 1 and 5 illustrate a hub structure wherein an adapter hub 1 is provided with an axial bore 2 for the reception of the usual shaft 3, Figure 1 illustrating this shaft as being driven by a motor indicated fragmentarily at 4. The sheave 5 includes a hub part 6 which is provided with an axial bore 7 within which the adapter hub 1 is inserted.

Figure 3:
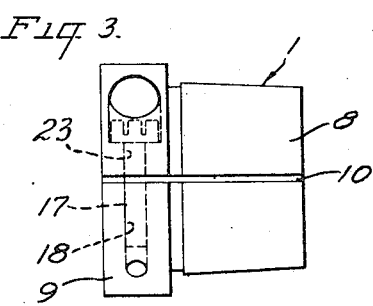
Figure 3 is an elevational view of the adapter hub.
Figure 4:
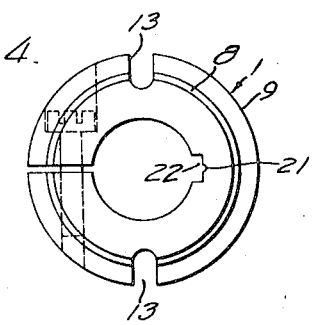
Figure 4 is an end view.

The adapter hub 1 includes a sleeve-like body 8 having a flange 9 at one end thereof. Both the flange and the body are cut through at 10 to permit the adapter hub to be flexed upon the shaft 3 for fixedly relating the two parts. In addition, the outer face of the body 8 is tapered in an axial direction as shown in Figure 3, and the bore 7 in the hub part 6 is provided with a corresponding taper so that the adapter hub 1 is caused to be flexed tightly about the shaft 3 through relative longitudinal movement of the adapter hub and the hub part.

Figure 2:
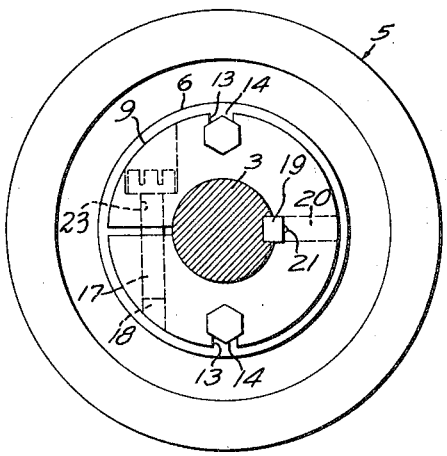
Fig. 2 is a view taken from the position indicated by line 2—2 of Figure 1.

In Figures 1 and 2, the hub part 6 is additionally secured to the adapter hub 1 by two bolts 11. These bolts extend through openings defined by recesses 12 in the adapter hub 1 and the hub part 6, see Figure 5, and through grooves 13 in the flange 9, which grooves are in continuation of the recesses 12 in the body 8. The heads 14 of the bolts engage the outer end face of the flange 9, while a washer 15 is interposed between one end face of the hub part 6 and the bolt nuts 16. It will be noted that the end face engaged by the washer 15 projects sufficiently far beyond the adjacent end of the adapter hub 1 to permit the hub part 6 to be drawn tightly upon the adapter hub without interference.

Means for additionally securing the adapter hub 1 to the shaft 3 comprises a bolt 17 which is threaded into a bore 18 in one end of the flange 9 and is disposed loosely in a bore 23 in the other end of the flange. Between the shaft 3 and the adapter hub 1 is interposed a conventional key 19 which is made secure by a set screw 20 threaded through the flange 9.

The sleve-like body 8 is of considerable thickness in a radial direction so as to provide material to be reamed out of the body for accommodating the adapter hub to shafts of larger diameters. The bore 7 may be standardized with respect to diameter for a large range of sheave diameters, so that such sheaves may be easily adapted to shafts of a large range of different diameters. A small groove 21 is provided in the adapter hub 1, which groove preferably opens through the bottom face of the keyway 22 in the adapter hub. The keyway 22 is arranged diametrically opposite the slot 10 and the groove 21 additionally weakens the adapter hub along the line of the groove to permit the adapter hub to be easily flexed tightly on the shaft 3.

It will be understood that the invention is not to be limited to the specific construction or arrangement of parts shown, but that they may be widely modified within the invention defined by the claim.

What is claimed is:

In a demountable sheave connection for transmitting the power of a motor or like power source which has a short rotatable power transmitting shaft, an adapter hub having a shaft receiving bore with a keyway in the wall thereof whereby said hub is mounted upon and keyed to said shaft, said hub being radially split along its entire length and having an internal longitudinal groove diametrically opposite said split extending radially from said bore, said hub having a flange formed on one end and substantially the remainder of said hub having an externally tapered portion, threaded means in said flange extending across said split for clamping said hub in a fixed position on said shaft, said hub being mounted on said shaft with the flange next to said motor, a sheave having a tapered opening for engaging the tapered portion of said hub mounted on said hub, said connection having a plurality of through bores parallel to the axis of said shaft, each of said bores being of uniform diameter and having one portion in the wall of the tapered opening of said sheave and the remaining portion in said hub so as to intersect the surface of engagement of said sheave and said hub, a bolt member extending through each of said bores, a nut member engaging said bolt member, one of said members bearing against the outer portion of said hub flange and the other bearing against the outer portion of said sheave whereby upon tightening of said bolt and nut the sheave will be drawn on said hub toward said motor.

CLARENCE J. HAHN.

REFERENCES CITED

The following references are of record in the file of this patent:

UNITED STATES PATENTS

| Number | Name | Date |
| --- | --- | --- |
| Re. 22,485 | Otto | May 23, 1944 |
| 1,116,845 | Rogers | Nov. 10, 1914 |
| 2,157,838 | Warner | May 9, 1939 |
| 2,377,046 | Siegerist | May 29, 1945 |
| 2,381,697 | Shepard | Aug. 7, 1945 |
| 2,396,414 | Firth | Mar. 12, 1946 |